United States Patent [19]

Popma et al.

[11] Patent Number: 4,751,148

[45] Date of Patent: Jun. 14, 1988

[54] LUMINESCENT ALUMINOBORATE GLASS AND LUMINESCENT SCREEN PROVIDED WITH SUCH A GLASS

[75] Inventors: Theo J. A. Popma, Enschede; Hendrik J. M. Joormann, Eindhoven, both of Netherlands

[73] Assignee: U.S. Philips Corp., New York, N.Y.

[21] Appl. No.: 849,602

[22] Filed: Apr. 8, 1986

[30] Foreign Application Priority Data

Apr. 16, 1985 [NL] Netherlands ................ 8501107

[51] Int. Cl.$^4$ ........................................... C09K 11/475
[52] U.S. Cl. ........................ 428/690; 252/301.4 R; 252/301.4 F; 252/301.6 R; 252/301.6 F; 428/427; 428/428
[58] Field of Search ............... 252/301.4 R, 301.6 R; 501/50; 428/427, 428, 690

[56] References Cited

U.S. PATENT DOCUMENTS 3,052,637  9/1962  Bishay ................ 252/301.4 R
3,522,191  7/1970  Turner et al. ........ 252/301.6 R
3,917,488  11/1975  Malmendier .............. 501/50

FOREIGN PATENT DOCUMENTS 43-300     1/1968  Japan ................ 252/301.4 R
57-128774  8/1982  Japan ................ 252/301.4 R

OTHER PUBLICATIONS

Blasse et al., "J. of Chem. Phys.", vol. 47, No. 6, 1967, pp. 1920–1926.

Primary Examiner—Jack Cooper
Attorney, Agent, or Firm—Ernestine Bartlett

[57] ABSTRACT

Luminescent aluminoborate and/or aluminosilicate glass which is activated by one or more rare earth metals. The glass has a matrix comprising from 5 to 65 mol. % of one or more of the alkaline earth metal oxides BaO, SrO, CaO, ZnO and MgO, from 20 to 85 mol. % of $B_2O_3$ and/or $SiO_2$ and from 1 to 35 mol. % of $Al_2O_3$. The glass contains as activator $Tb^{3+}$ and/or $Ce^{3+}$ in a quantity, calculated as $Tb_2O_3$ and/or $Ce_2O_3$, of 0.1 to 10 mol. % with respect to the matrix. The luminescent glasses have high conversion efficiencies, especially high quantum efficiencies upon UV excitation, and are preferably used in luminescent screens of, for example, discharge lamps or cathode-ray tubes.

4 Claims, No Drawings

LUMINESCENT ALUMINOBORATE GLASS AND LUMINESCENT SCREEN PROVIDED WITH SUCH A GLASS

The invention relates to a luminescent aluminoborate and/or aluminosilicate glass which is activated by one or more rare earth metals.

U.S. Pat. No. 4,102,805 discloses luminescent alkaline earth metal aluminosilicate glasses containing bivalent europium as an activator. Alkaline earth metal aluminoborate glasses activated by bivalent europium are described in U.S. Pat. No. 3,522,191. Such borate glasses, but provided with bivalent samarium as an activator, are known from U.S. Pat. No. 3,522,190. The article in "Optics and Spectroscopy", Vol. XX, No. 3, (1966), p. 487–488 describes a dysprosium-activated magnesium alumino-borate glass. DE PS No. 1,173,591 discloses a luminescent neodymium-activated alkaline earth metal aluminosilicate borate glass.

A great disadvantage of the known luminescent glasses is that they generally have a low efficiency. More particularly the quantum efficiency upon excitation by ultraviolet radiation is mostly found to be a factor 5 to 10 lower than the quantum efficiencies which can be attained with efficient crystal line luminescent materials. In those cases in which luminescent materials are used which have to be excited by ultraviolet radiation, use is therefore hitherto substantially solely made of crystalline luminescent materials, mostly in the form of crystalline powders.

The invention has for its object to provide luminescent glasses which have high conversion efficiencies and more particularly high quantum efficiencies upon excitation by ultraviolet radiation.

According to the invention, a luminescent aluminoborate and/or aluminosilicate glass activated by one or more rare earth metals is characterized in that the glass has a matrix comprising from 5 to 65 mol.% of at least one of the alkaline earth metal oxides BaO, SrO, CaO, ZnO, and MgO, from 20 to 85 mol.% of at least one of the oxides $B_2O_3$ and $SiO_2$ and from 1 to 35 mol. % of $Al_2O_3$, and in that the glass contains at least one of the activators $Tb^{3+}$ and $Ce^{3+}$ in a quantity, calculated as $Tb_2O_3$ and/or $Ce_2O_3$, of from 0.1 to 10 mol. % with respect to the matrix.

Experiments leading to the invention have surprisingly shown that glasses having a matrix in the aforementioned range of compositions can form very efficiently luminescing materials upon activation by trivalent terbium and/or trivalent cerium. It has been found more particularly that upon UV excitation quantum efficiencies of 80 % are possible. It has been found that it is important for obtaining such high efficiencies that the luminescent glasses are free from alkali metal and also that they contain $Al_2O_3$. As activators, the elements Tb and/or Ce are used. Upon excitation of the luminescent glass, terbium produces the characteristic green $Tb^{3+}$ emission (maximum at about 540 nm). Upon activation by Ce, emission is obtained in a band in the blue to near ultraviolet part of the spectrum. If this glass is activated by both Ce and Tb, excitation energy is transmitted from the Ce to the Tb.

The composition of the matrix of the glass according to the invention should be chosen within the range defined above because it has been found that outside this range formation of glass is not possible due to an excessively high melting temperature and/or due to inevitable crystallization of the matrix material with the activator oxides incorporated therein. It is further possible that outside the given range glasses of another kind are formed which have a less efficient luminescence. The formation of glass in the given range of compositions further depends upon the choice and the relative quantities of the matrix oxides. It is possible that the formation of glass occurs only at very high temperatures or that crystallization can be avoided only by taking particular precautions. It has further been found that these glasses generally have a comparatively short melting trajectory. In this description and in the claims, Mg and Zn are considered as alkaline earth metals.

The luminescent glasses according to the invention can be used due to their high quantum efficiency instead of crystalline luminescent materials, for example in the discharge lamps, such as low-pressure mercury vapour or high-pressure mercury vapour discharge lamps. They then have great advantages as compared with the crystalline materials. For example, there is a greater possibility of variation in the composition than in the case of crystalline materials, as a result of which the luminescent properties can be more readily influenced. Glasses also have their specific favourable possibilities of processing and shaping. The glass can be applied as a continuous layer, for example in lamps, as a result of which the surface area liable to be attacked is reduced. When using glass powders, it is further possible to adjust a very accurate grain size of luminescent glass grains. The luminescent glass can further be shaped into the form of small rods, as a result of which a non-Lambertian radiation is obtained with the use in, for example, lamps. The luminescent glasses according to the invention may further advantageously be used in cathode-ray tubes and in solid state lasers. A further advantageous application is found in luminescent glass fibres or glass fibre heads, which may be used, for example, for detection purposes. The luminescent glasses may also advantageously be used for the window of photomultipliers or phototubes, which have a spectral sensitivity extending into the ultraviolet range. These arrangements generally have been provided hitherto with an expensive quartz window, to which a photocathode is applied on the inner side. When the quartz window is replaced by a luminescent glass according to the invention, the sensitivity of the arrangement is extended to shorter wavelengths, whilst the sensitivity of the arrangement can remain high because the spectral distribution of the emission of the glass can be adapted to the maximum sensitivity of the photocathode.

Preferably, a luminescent glass according to the invention is used, which is characterized in that the matrix comprises from 20 to 45 mol.% of alkaline earth metal oxide, from 40 to 70 mol. % of $B_2O_3$ and/or $SiO_2$ and from 5 to 20 mol. % of $Al_2O_3$. In fact it has been found that in this preferential range of compositions the formation of glass occurs most easily and that the highest quantum efficiencies are obtained.

An advantageous embodiment of a luminescent glass according to the invention is characterized in that the matrix is an aluminoborate glass containing at least one of the oxides BaO, SrO, and CaO. It has been found that especially upon 254 nm excitation optimum results are obtained with borate glasses. Preferably, BaO, SrO and/or CaO are then chosen as the alkaline earth metal oxide.

A next preferred embodiment of a luminescent glass according to the invention is characterized in that the matrix is an aluminosilicate glass containing at least one of the oxides BaO, SrO and CaO. It has been found that also for the silicate glasses the choice of BaO, SrO and/or CaO leads to the highest quantum efficiencies.

A further advantageous embodiment of a luminescent glass according to the invention is characterized in that the matrix is an aluminosilicate borate glass in which the molar ratio $SiO_2:B_2O_3$ has a value of from 10 to 1 and which contains CaO and at least one of the oxides MgO, ZnO, SrO and BaO. With these glasses it is possible to influence the excitation spectrum by means of the $SiO_2:B_2O_3$ ratio. Thus, the excitation at a given desired wavelength (for example the 254 nm mercury resonance radiation) can be optimized.

The luminescent glasses according to the invention can be obtained in that a starting mixture of the constituent oxides or of compounds yielding these oxides at an increase in temperature is heated in a furnace to a high temperature at least until the melting point is attained. In most cases the melting point is attained in the range of from 900° C. to 1800° C., depending upon the composition. Heating should take place in a given atmosphere in order to obtain or to maintain the desired valency of the activator. In general for this purpose a reducing or weakly reducing gas is passed during heating into the furnace or into the crucible containing the starting mixture. The melt is kept at high temperature for some time, as a result of which homogenization occurs, after which it is cooled. In many cases the cooling process should be effected rapidly, for example by pouring out, in order to prevent crystallization.

For further explanation, a number of examples of luminescent glasses according to the invention and a number of measurements are now given.

EXAMPLE 1

A mixture was made of:
0.40 mol of BaO
0.15 mol of $Al_2O_3$
0.45 mol of $B_2O_3$
0.03 mol of $Tb_4O_7$ (calculated as $Tb_2O_3$:0.06 mol).

This mixture of starting materials, which all had a high degree of purity (for the rare earth metal oxides at least 99.999 % and for the remaining oxides at least 99.99 %), was heated in a platinum crucible in a furnace to 1200° C. The molten mixture was kept at this temperature for 5 hours. During heating, a weakly reducing gas (nitrogen containing about 5 % by volume of hydrogen) was passed through the melt by means of a platinum tube extending into the mixture. Subsequently, the melt was cooled rapidly by pouring it onto a plate of stainless steel. The luminescent $Tb^{3+}$-activated glass obtained was broken luminescent and subjected to a grinding operation, after which the pulverulent product was ready for use. Upon excitation with electrons (25 kV), the glass was found to emit the characteristic green $Tb^{3+}$ radiation with an energy conversion efficiency of 2 %. Upon excitation with ultraviolet radiation having a wavelength of mainly 254 nm, the quantum efficiency was found to be 74%.

EXAMPLES 2 to 15

In the same manner as indicated for Example 1, a number of luminescent aluminoborate glasses of different compositions were prepared. These glasses were all found to melt at about 1200° C. The following table 1 indicates the composition (in moles) of these glasses. The table further states the results of measurements of absorption A of the exciting 254 nm radiation (A is given as 100 % minus the diffuse reflection in %) and of the quantum efficiency q (in %) upon 254 nm excitation of the pulverulent glasses.

TABLE

| Example | Composition (mol) | A (%) | q (%) |
|---|---|---|---|
| 1 | 40 BaO 15 $Al_2O_3$ 45 $B_2O_3$ 3 $Tb_4O_7$ | 75 | 74 |
| 2 | 35 BaO 30 $Al_2O_3$ 35 $B_2O_3$ 3 $Tb_4O_7$ | 78 | 73 |
| 3 | 20 BaO 20 $Al_2O_3$ 60 $B_2O_3$ 3 $Tb_4O_7$ | 58 | 58 |
| 4 | 15 BaO 5 $Al_2O_3$ 80 $B_2O_3$ 3 $Tb_4O_7$ | 51 | 49 |
| 5 | 40 SrO 15 $Al_2O_3$ 45 $B_2O_3$ 3 $Tb_4O_7$ | 69 | 81 |
| 6 | 40 ZnO 15 $Al_2O_3$ 45 $B_2O_3$ 3 $Tb_4O_7$ | 59 | 62 |
| 7 | 40 CaO 15 $Al_2O_3$ 45 $B_2O_3$ 3 $Tb_4O_7$ | 72 | 78 |
| 8 | 40 MgO 15 $Al_2O_3$ 45 $B_2O_3$ 3 $Tb_4O_7$ | 60 | 69 |
| 9 | 50 BaO 15 $Al_2O_3$ 35 $B_2O_3$ 3 $Tb_4O_7$[1] | 77 | 77 |
| 10 | 50 BaO 5 $Al_2O_3$ 45 $B_2O_3$ 3 $Tb_4O_7$[1] | 68 | 77 |
| 11 | 39 BaO 1 $Al_2O_3$ 60 $B_2O_3$ 3 $Tb_4O_7$ | 70 | 71 |
| 12 | 25 BaO 15 $Al_2O_3$ 60 $B_2O_3$ 3 $Tb_4O_7$ | 67 | 58 |
| 13 | 28.9 BaO 9.3 $Al_2O_3$ 61.8 $B_2O_3$ 3.1 $Tb_4O_7$ | 32 | 70 |
| 14 | 40 BaO 15 $Al_2O_3$ 45 $B_2O_3$ 1 $Ce_2O_3$ | 80 | 45 |
| 15 | 27.8 BaO 9.4 $Al_2O_3$ 62.8 $B_2O_3$ 3.14 $Ce_2O_3$ 1.57 $Tb_4O_7$[2] | 90 | 47 |

[1] molten in quartz crucible.
[2] molten in alundum crucible in reducing atmosphere ($H_2$).

EXAMPLES 16 to 22

In the same manner as described for Example 1, a number of luminescent aluminosilicate glasses were obtained. These glasses were generally found to melt at 1600° C. to 1700° C. Table 2 again indicates the composition of these glasses and the measurements upon 254 nm excitation.

TABLE 2

| Example | Composition (mol) | A (%) | q (%) |
|---|---|---|---|
| 16 | 25 SrO 15 $Al_2O_3$ 60 $SiO_2$ 3 $Tb_4O_7$ | 79 | 50 |
| 17 | 25 CaO 15 $Al_2O_3$ 60 $SiO_2$ 3 $Tb_4O_7$ | 79 | 43 |
| 18 | 25 MgO 15 $Al_2O_3$ 60 $SiO_2$ 3 $Tb_4O_7$ | 79 | 36 |
| 19 | 25 ZnO 15 $Al_2O_3$ 60 $SiO_2$ 3 $Tb_4O_7$ | 82 | 33 |
| 20 | 30 BaO 30 $Al_2O_3$ 40 $SiO_2$ 3 $Tb_4O_7$ | 89 | 42 |
| 21 | 35 BaO 5 $Al_2O_3$ 60 $SiO_2$ 3 $Tb_4O_7$ | 86 | 62 |
| 22 | 45 BaO 15 $Al_2O_3$ 40 $SiO_2$ 3 $Tb_4O_7$ | 91 | 23 |

EXAMPLES 23 to 29

Luminescent aluminosilicate borate glasses were obtained in the same manner as described for Example 1. These glasses were generally found to melt at a temperature of about 1400° C. The MgO-containing glasses had a higher melting point (up to about 1600° C. with larger MgO contents), however. Table 3 indicates with the composition of these glasses and the results of measurements (upon 254 nm excitation).

TABLE 3

| Example | Composition (mol) | A (%) | q (%) |
|---|---|---|---|
| 23 | 30 SrO 15 $B_2O_3$ 10 $Al_2O_3$ 45 $SiO_2$ 3 $Tb_4O_7$ | 76 | 58 |
| 24 | 30 BaO 15 $B_2O_3$ 10 $Al_2O_3$ 45 $SiO_2$ 3 $Tb_4O_7$ | 84 | 49 |
| 25 | 30 MgO 15 $B_2O_3$ 10 $Al_2O_3$ 45 $SiO_2$ 3 $Tb_4O_7$ | 74 | 56 |
| 26 | 15 CaO 15 ZnO 15 $B_2O_3$ 10 $Al_2O_3$ 45 $SiO_2$ 3 $Tb_4O_7$ | 71 | 60 |
| 27 | 15 CaO 15 SrO 15 $B_2O_3$ 10 $Al_2O_3$ 45 $SiO_2$ 3 $Tb_4O_7$ | 72 | 67 |
| 28 | 15 CaO 15 BaO 15 $B_2O_3$ 10 $Al_2O_3$ 45 $SiO_2$ 3 $Tb_4O_7$ | 83 | 59[1] |
| 29 | 15 CaO 15 MgO 15 $B_2O_3$ 10 $Al_2O_3$ 45 $SiO_2$ 3 $Tb_4O_7$ | 68 | 56 |

[1]Energy conversion efficiency upon electron excitation (25 kV): 2%.

The luminescent glasses according to the invention are preferably used in a luminescent screen, which generally consists of a carrier on which the luminescent glass is provided as a luminescent layer. Such screens are used, for example, in discharge lamps and cathode-ray tubes.

What is claimed is:

1. A luminescent aluminoborate and/or aluminosilicate glass with high quantum efficiency upon excitation by ultraviolet radiation having a matrix which consists of from 5 to 65 mol. % of at least one alkaline earth metal oxide selected from the group consisting of BaO, SrO, CaO, ZnO and MgO; from 20 to 85 mol. % of $B_2O_3$; from 1 to 35 mol. % of $Al_2O_3$; and from 0.1 to 10 mol. %, based on the matrix, of at least one activator selected from the group consisting of $Tb^{3+}$ and $Ce^{3+}$, calculated as $Tb_2O_3$ and $Ce_2O_3$.

2. A luminescent glass as claimed in claim 1 in which the alkaline earth metal oxide is present in amount of 20 to 45 mol. %, $B_2O_3$ is present in amount of 40 to 70 mol. % and $Al_2O_3$ is present in an amount of 5 to 20 mol. %.

3. A luminescent glass as claimed claims 1 or 2 in wherein said alkaline earth oxide metal is at least one oxide selected from the group consisting of BaO, SrO and CaO.

4. A luminescent screen provided with a luminescent layer on a carrier and comprising a luminescent aluminoborate glass as claimed in claim 1 or 2.

* * * * *